United States Patent
Asai

[11] Patent Number: 5,804,229
[45] Date of Patent: Sep. 8, 1998

[54] MOLD FOR MOLDING DISCS

[75] Inventor: Ikuo Asai, Aichi, Japan

[73] Assignee: Kabushiki Kaisha Meiki Seisakusho, Aichi-ken, Japan

[21] Appl. No.: 876,487

[22] Filed: Jun. 16, 1997

[30] Foreign Application Priority Data

Oct. 29, 1996 [JP] Japan .................................. 8-303972

[51] Int. Cl.⁶ .................................................. B29C 45/43
[52] U.S. Cl. ........................... 425/556; 425/437; 425/810
[58] Field of Search .................................. 425/437, 556, 425/810; 264/106

[56] References Cited

U.S. PATENT DOCUMENTS

| | | | |
|---|---|---|---|
| 4,790,738 | 12/1988 | Shimojo et al. | 425/810 |
| 4,795,127 | 1/1989 | Asai | 425/810 |
| 4,979,891 | 12/1990 | Kitamura | 425/437 |
| 5,092,758 | 3/1992 | Tanaka et al. | 425/810 |
| 5,180,595 | 1/1993 | Kinoshita | 425/810 |
| 5,297,951 | 3/1994 | Asai | 425/437 |
| 5,626,890 | 5/1997 | Asai | 425/556 |

FOREIGN PATENT DOCUMENTS 1-176536  7/1989  Japan .................................. 425/437

*Primary Examiner*—Robert Davis
*Attorney, Agent, or Firm*—Browdy and Neimark

[57] ABSTRACT

A mold for molding discs includes a outer stamper retainer with an outer peripheral retaining foot to closely contact on the surface of a stamper not to permit compressed air to lead outwards and an inner peripheral retaining foot to contact permit compressed air for releasing molded discs from the stamper to be blown through a groove located between the both feet resulting in increasing the performance of compressed air for releasing molded discs from the stamper.

5 Claims, 4 Drawing Sheets

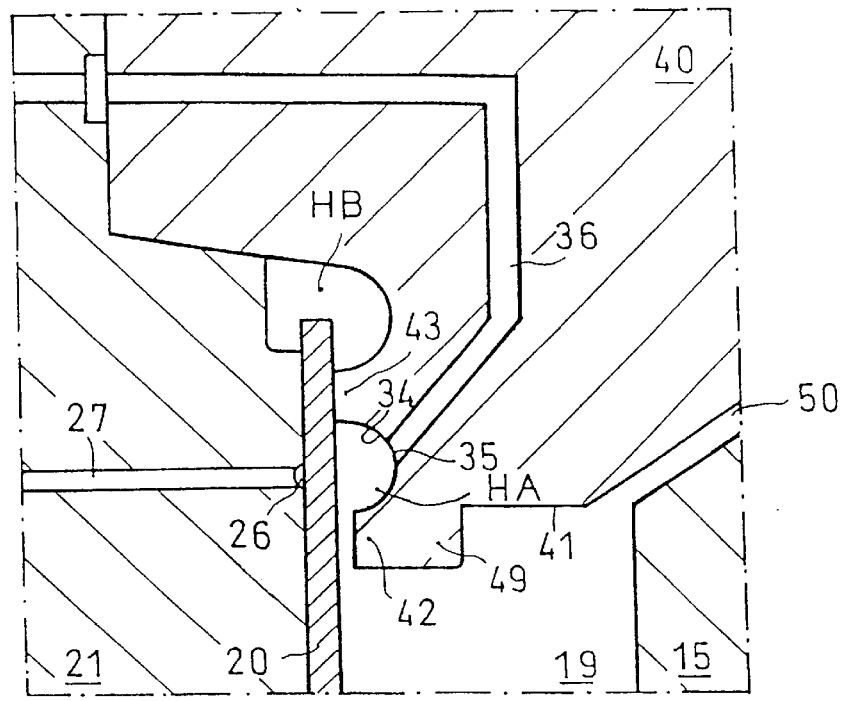
F I G . 3
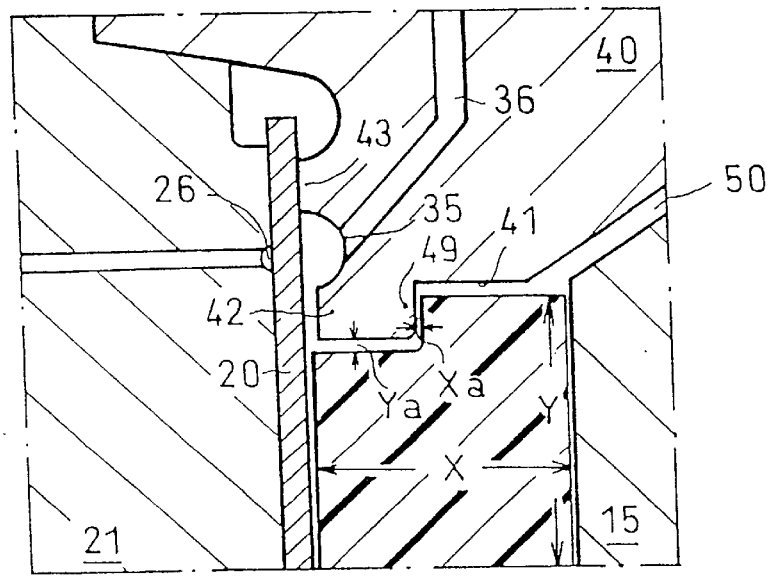
F I G . 4

MOLD FOR MOLDING DISCS

FIELD OF THE INVENTION

The present invention relates generally to a mold for molding discs and more particularly concerns the improvement of an outer stamper retainer in a mold for molding discs.

REVIEW OF THE RELATED TECHNOLOGY

FIG. 5 and FIG. 6 show two types of outer stamper retainers, each of which includes an air passage for blowing air for releasing molded discs from a stamper.

In FIG. 5, a stamper 70 is retained at its central portion on the surface of a movable mirror block 63 by an inner stamper retainer (not shown) and a retaining foot 82 provided with an outer stamper retainer 80 having a ring shape. An air passage 89 contacts the surface of stamper 70. In addition, the outer peripheral portion of the stamper 70 is drawn to the surface of a movable mirror block 63 by air suction from a passage 66 provided in the movable mirror block 63. The outer stamper retainer 80 fits with an outer peripheral surface 63a of the mirror block 63. An inner peripheral surface 81 of the outer stamper retainer 80 forms an outer peripheral wall of a cavity 61 for molding discs.

The surface of a mirror plate 62 in a stationary mold half forms a disc wall of the cavity 61.

When removing molded discs from the mold, compressed air is blown through the air passage 89 of the outer stamper retainer 80 so as to penetrate into a slight clearance of approximately five to twenty μm between the surfaces of the stamper 70 and the retaining foot 82 of the outer stamper retainer 80, promoting release the molded disc from the surface of the stamper.

In FIG. 6, the outer stamper retainer 90 disclosed in U.S. Pat. No. 5,626,890 (application Ser. No. 08/550,468) is shown. The outer stamper retainer 90 has a retaining foot 92 with a protruding portion 95 on its inner peripheral surface 91 to prevent leakage of compressed air along the its inner peripheral surface 91 due to a narrow gap produced by shrinkage in the thickness direction on the outer peripheral surface of the molded discs in the cavity 61, whereby releasing of the molded discs from the stamper 70 is improved.

A difficulty arises from the profiles of the retaining portions of each outer stamper retainer shown in FIG. 5 and FIG. 6. The outer peripheral portion 70a of stamper 70 hangs over the outer periphery of the mirror block 63 to prevent the surface of the mirror block 63 from being scratched by the edge of the outer peripheral portion 70a of the stamper 70. A space H formed by a circular groove 87 on the bottom surface of the outer stamper retainer 80 permits the outer periphery of the stamper to deform freely as disclosed in U.S. Pat. No. 4,795,127.

When compressed air is blown through the air passage 89 of the outer stamper retainer 80 or 90 to release the molded disc from the stamper 70, the compressed air fills in the space H to penetrate into not only the clearance between the stamper 70 and the molded discs but also the clearance between the surfaces of stamper 70 and the mirror block 63 because the clearance between the surfaces of the stamper 70 and the mirror block 63 leads to the space H.

This results in decreasing the amount of compressed air for releasing the molded disc and prevents the surface of the mirror block 63 from completely sticking to the outer peripheral portion of the stamper 70.

Incomplete sticking of the stamper to the surface of the mirror block 63, due to penetration of the compressed air, causes the stamper 70 to cool unequally, causing cloud to grow on the molded discs and degrading the birefringence of the discs.

Secondly, in a mold automatically exchanging an outer stamper retainer from a mirror block as disclosed in U.S. Pat. No. 4,790,738, the outer stamper retainer holds the stamper with a necessary and minimum resilient spring force so that the surface of the stamper is not scratched when the outer stamper retainer is turned on the stamper for exchanging the outer stamper retainer.

In the mold for exchanging automatically an outer stamper retainer with the outer stamper retainer 80 or 90 shown in FIG. 5 or 6, when molded discs are released from the stamper by compressed air, the high-pressure air acting on the projection area of the circular groove 87 often causes the outer stamper retainer to lift from the stamper 70, resulting in producing molded discs with flash or unequal thickness.

SUMMARY OF THE INVENTION

In light of the above mentioned problems, it is an object of the present invention to provide a novel mold capable of producing discs whose quality is not influenced by the compressed air used to release molded discs from a stamper.

Another object of the invention is to provide a novel mold having a novel outer stamper retainer which allows the compressed air used to release molded discs from a stamper completely to penetrate between the stamper and the surface of the molded disc.

A further object of the present invention is to provide a novel mold having a novel outer stamper retainer which is not lifted against the resilient force of the springs holding the outer stamper retainer on the mirror block upon blowing compressed air to release the molded discs from the stamper.

BRIEF DESCRIPTION OF THE DRAWING FIGURES

The above and further objects and the nature and advantages of the invention will become clear to those skilled in the art from the following detailed description of embodiments taken in conjunction with the drawing, wherein:

FIG. 3 is an exaggerated fragmentary sectional view of other embodiment of the outer stamper retainer in FIG. 1.

FIG. 4 is an exaggerated fragmentary sectional view of the embodiment of FIG. 3 which illustrates shrinkage of injected resin into the cavity of a mold.

DETAILED DESCRIPTION OF THE PREFERRED EMBODIMENTS

This invention will described in further detail by way of an example with reference to the accompanying drawings.

Figure 1:
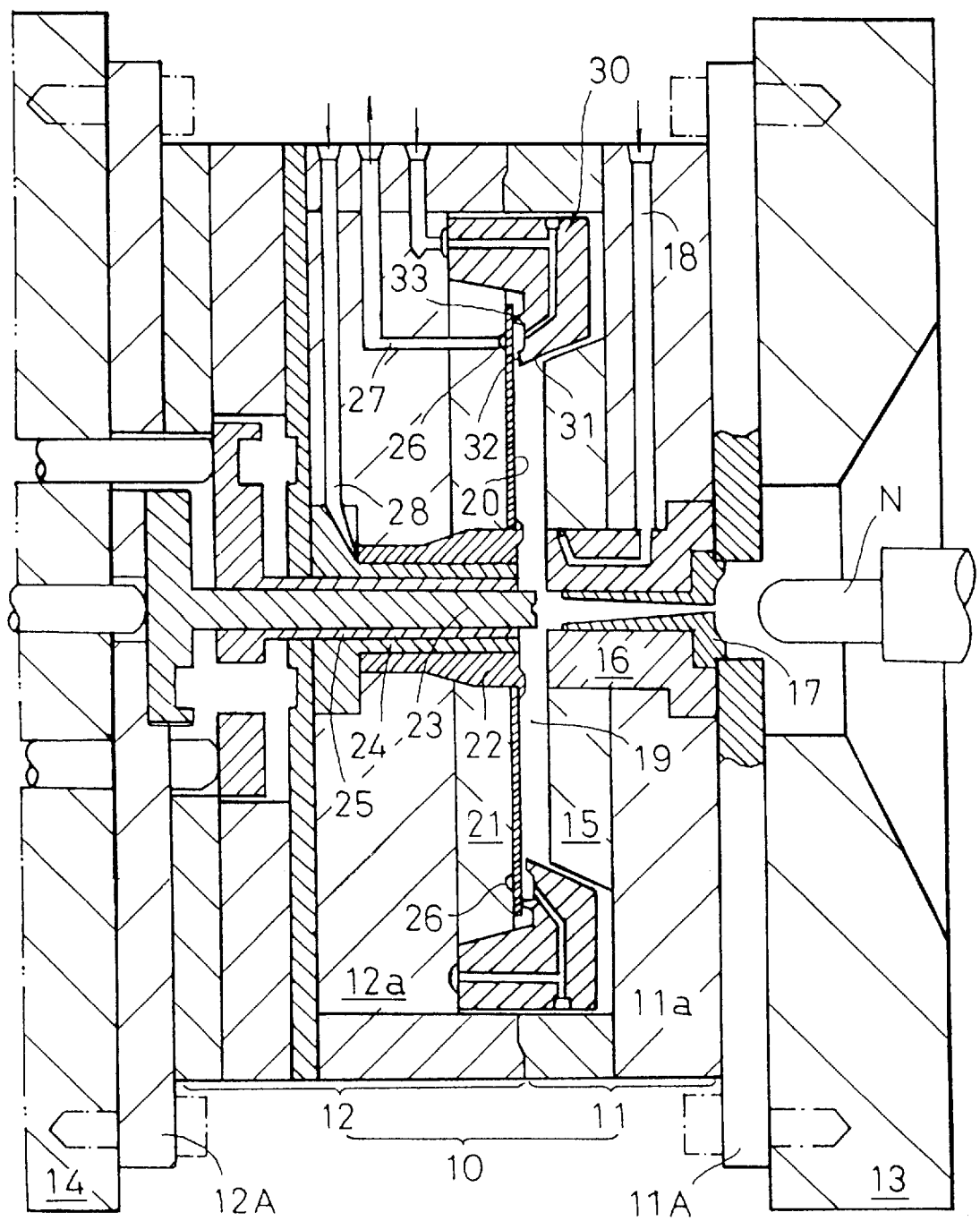
FIG. 1 is a sectional elevational view of the mold of the present invention.

Referring to FIG. 1, a mold 10 includes a stationary moldhalf 11 with a stationary base plate 11A fixed to stationary platen 13 and a movable moldhalf 12 with movable base plate 12A fixed to a movable platen 14.

Referring the stationary moldhalf 11, a stationary mirror block 15 is fixed concentrically to a stationary intermediate plate 11a fixed to the stationary base plate 11A.

A female cutter 16 is inserted fixedly into the central portion of the stationary intermediate plate 11a and the stationary mirror block 15. Both end faces of the female cutter 16 are flush with the surface of the plates 11a and the stationary mirror block 15 respectively. An air passage 18 for blowing compressed air along the outer periphery of the female cutter 16 is provided in the inside of the stationary intermediate plate 11a. A sprue bush 17 is inserted fixedly concentrically into the central portion of the female cutter 16. The letter N designates an injection nozzle of an injection molding machine.

Referring to the movable moldhalf 12, a movable mirror block 21 is fixed concentrically to a movable intermediate plate 12a. A stamper 20 is fixed on the movable mirror block 21 by an inner stamper retainer 22 at its central portion. A movable male cutter 23 for forming a central aperture of the disc and a movable ejector sleeve 25 for releasing molded discs are respectively in a stationary sleeve 24 inserted fixedly into the inner stamper retainer 22.

The outer peripheral portion of the stamper 20 is stuck to the surface of the movable mirror block 21 by air suction from a ring groove 26 through an air passage 27. The stamper 20 can be mounted to either side of the stationary moldhalf or the movable moldhalf according to the specification of a mold.

An air passage 28 for releasing molded discs leads to the clearance between the inner peripheral surface of the inner stamper retainer 22 and the outer peripheral surface of the stationary sleeve 24.

The outer stamper retainer 30 is mounted to fit against an outer peripheral surface of the movable mirror block 21, and has an inner peripheral surface 31 which forms an outer peripheral wall of a cavity 19.

Figure 2:
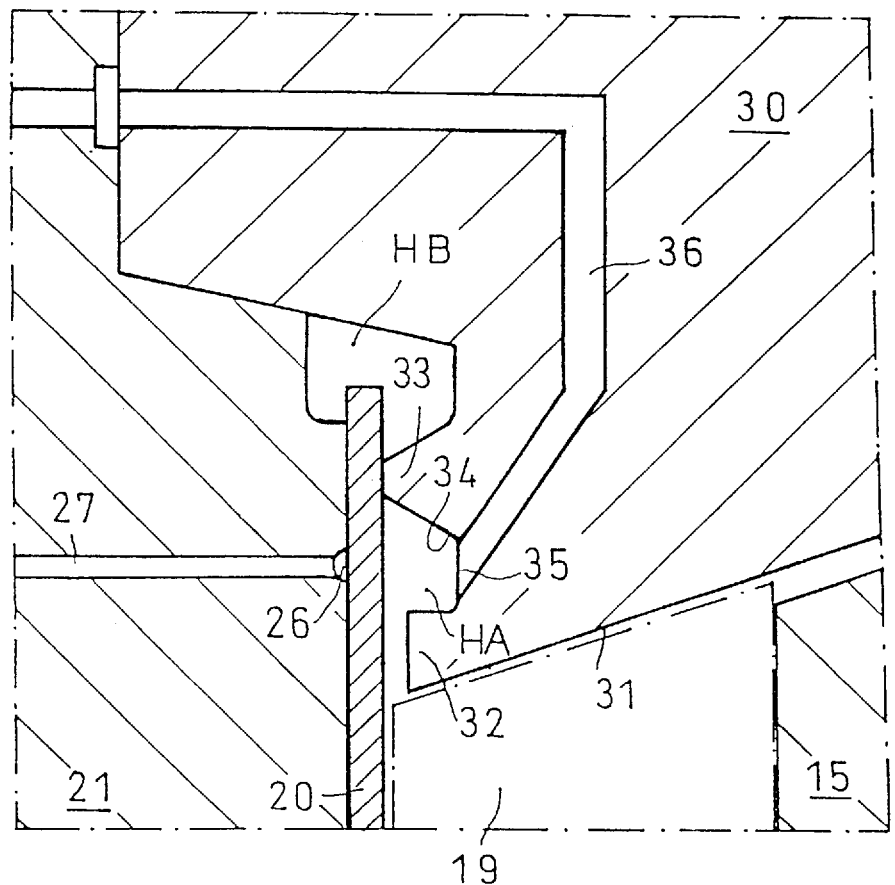
FIG. 2 is an exaggerated fragmentary sectional view of an embodiment of the outer stamper retainer in FIG. 1.
Figure 5:
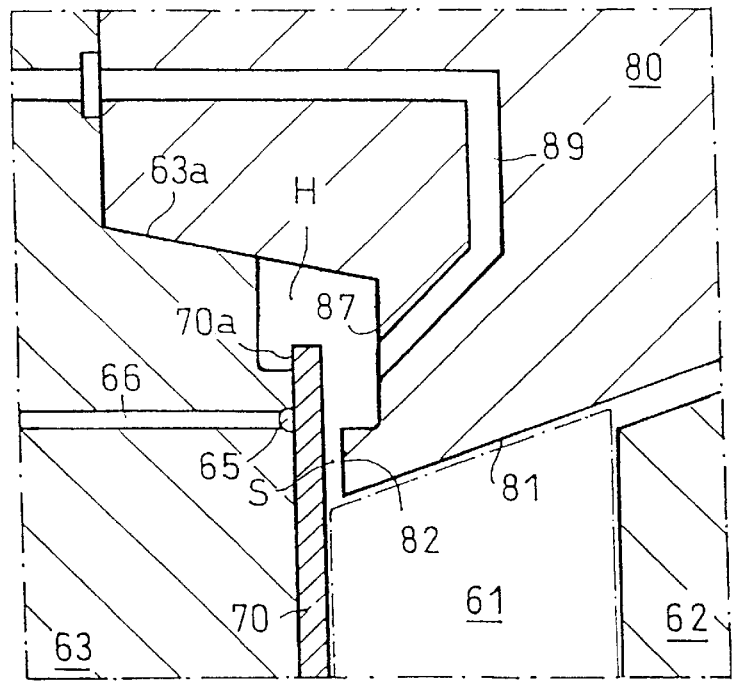
FIG. 5 is an exaggerated fragmentary sectional view of an embodiment of the outer stamper retainer of the prior art.
Figure 6:
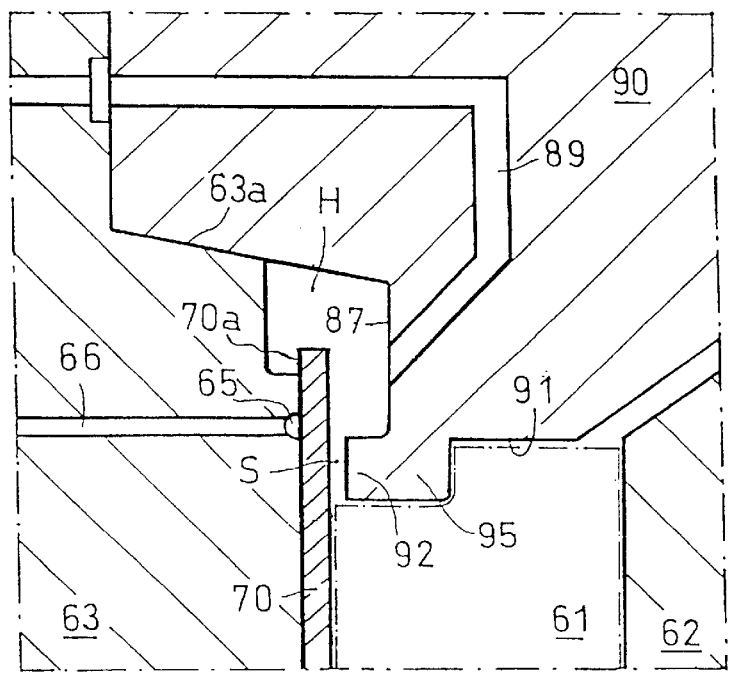
FIG. 6 is an exaggerated fragmentary sectional view of other embodiment of the outer stamper retainer of the prior art.

Referring to FIG. 2, the outer stamper retainer 30 has an inner peripheral retainer foot 32 and an outer peripheral retainer foot 33 for retaining the stamper 20.

A air outlet 35 of an air passage 36 connects to a circular groove 34 located between the inner peripheral retainer foot 32 and the outer peripheral retainer foot 33. The outer peripheral retainer foot 33 and the inner peripheral retainer foot 32 make a space HA and HB. The outer peripheral retainer foot 33 closely or nearly contacts the surface of the stamper 20 lest the compressed air from the circular groove 34 (the sapce HA) should leak outwards. The clearance between the surface of the stamper 20 and the outer peripheral retainer foot 33 is preferably less than five μm in consideration of variations due to thermal expansion of the stamper 20. The inner peripheral retainer foot 32 retains the stamper 20 so as to enable compressed air to penetrate into the clearance between the surfaces of molded disc and the stamper 20. The clearance between the surface of the stamper 20 and the inner peripheral retainer foot 32 is preferably five to twenty μm for releasing the molded discs from the stamper 20.

Referring to FIG. 3, the outer stamper retainer 40 shown is different from the outer stamper retainer 30 of FIG. 2 in its inner peripheral surface. A protruding annular surface 49, as disclosed U.S. Pat. No. 5,626,890, is included on the inner peripheral surface 41 of the outer stamper retainer 40. A retainer portion of the outer stamper retainer 40 has an inner peripheral retainer foot 42 and an outer peripheral retainer foot 43 for retaining the stamper 20. A air outlet 35 of an air passage 36 connects with a circular groove 34 located between the inner peripheral retainer foot 42 and the outer peripheral retainer foot 43. The outer peripheral retainer foot 43 and the inner peripheral retainer foot 42 make a space HA and HB.

The outer peripheral retainer foot 43 closely or nearly contacts the surface of the stamper 20 lest the compressed air from the circular groove 34 (the space HA) should leak outwards (to the space HB). The clearance between the surface of the stamper 20 and the outer peripheral retainer foot 43 is preferably less than five μm in consideration of variations due to thermal expansion of the stamper 20.

The inner peripheral retainer foot 42 contacts the stamper 20 with a clearance between the surfaces of molded disc and the stamper. This clearance is preferably five to twenty μm for releasing the molded discs from the stamper 20.

The operation is as follows:

After mold closing, melted resin is injected through the sprue bush 17 into the cavity 19 which is to be filled.

When solidifying proceeds to a predetermined degree (this is decided in seconds), compressed air is blown into both clearances between the surface of the stationary mirror block 15 and the molded disc from the passage 18 and between the surface of the stamper 20 and the molded disc from the space HA through the circular groove 34 and the passage 36.

The ejector sleeve 25 advances as soon as the mold is opened. Simultaneously, compressed air penetrates into the clearance between the surfaces of the stamper 20 and the molded disc from the circular groove 34 and from the passage 28, respectively, resulting in releasing the molded disc from the stamper 20. Then the molded disc is taken off from the mold to complete one cycle of disc molding.

In the mold shown in FIG. 3, when the resin injected into the cavity 19 is cooled, there exists between the inner peripheral surface 41 of the outer stamper retainer 40 and the molded discs a gap Ya along the radius Y of the molded disc, due to resin shrinkage. A gap Xa along thickness X is due to the presence of the protruding surface 49. The gap Xa is very narrow in comparison with the clearance Ya due to the difference in radius and thickness of the molded disc. In the conventional compact disc 120 mm in diameter and 1.2 mm in thickness, Xa is 0.0072 mm and Ya is 0.72 mm.

The presence of the protruding surface 49 prevents releasing compressed air along the inner peripheral surface of the outer stamper retainer 40 due to the narrow gap Xa.

The present invention includes a novel mold in which the outer stamper retainer 30 (40) can be provided with the outer peripheral retainer foot 33 (43) in addition to the inner peripheral retainer foot 32 (42) to improve release of the molded discs by compressed air. The improvement is due to preventing compressed air from leaking toward the space HB, and to preventing the outer stamper retainer 30 (40) from being lifted due to providing a small projection area in the space HA.

Moreover, the small volume of the space HA provides a quick response of the compressed air to improve the timing control of the compressed air.

In addition, releasing of the molded discs is much improved by using the outer stamper retainer 40, which prevents leakage of compressed air along the inner peripheral surface 41 by the presence of the protruding surface 49.

The above-mentioned effects of the present invention contribute to preventing cloud on the molded discs and improving their birefringence.

The foregoing description of the specific embodiment will so fully reveal the general nature of the invention that other can, by applying current knowledge, readily modify and/or adapt for various application such specific embodiments without undue experimentation and without departing from the generic concept, and therefore such adaptations and modifications should be and are intended to be comprehended within the meaning and range of equivalents of the disclosed embodiments. The means and materials for carrying out various disclosed functions may take a variety of alternative forms without the invention. It is to be understood that the phraseology or terminology employed herein is for the purpose of description and not of limitation.

The expressions "means to . . . " and "means for . . . " as may be found in the specification above and/or in the claims below, followed by a functional statement, are intended to define and cover whatever structural, physical, chemical or electrical element or structure may now or in the future exist for carrying out the recited function, whether or not precisely equivalent to the embodiment or embodiments disclosed in the specification above; and it is intended that such expressions be given their broadest interpretation consistent with the required function.

What is claimed is:

1. A mold for molding discs including two moldhalves being relatively movable, one of the moldhalves comprising;

a mirror block fixed to a base plate with intermediate plates;

a stamper;

an inner stamper retainer;

an outer stamper retainer comprising means for retaining an outer peripheral portion of the stamper and mounted to fit concentrically with an outer peripheral surface of the mirror block;

the outer stamper retainer comprising an inner peripheral retaining foot and an outer peripheral retaining foot contacting a stamper surface of the stamper;

the outer stamper retainer comprising a circular groove, located between the inner peripheral retainer foot and the outer peripheral retainer foot, with an air outlet to blow compressed air into the groove for releasing molded discs from the stamper;

the outer stamper retainer being a single integral part, the single part including the inner peripheral retaining foot, the outer retaining foot, and the circular groove;

the outer stamper retainer comprising an inner peripheral surface comprising an outer peripheral wall of a disc cavity.

2. The mold for molding discs as defined in claim 1, wherein the inner peripheral surface includes an annular protruding surface.

3. The mold for molding discs as defined in claim 1, wherein the inner peripheral retaining foot is disposed adjacent the stamper surface with a clearance therebetween, comprising means to enable the compressed air to penetrate between the stamper surface and the molded disc and wherein the outer peripheral retaining foot closely contacts the surface of the stamper, comprising means not to permit the compressed air to leak.

4. The mold for molding discs as defined in claim 3, wherein the clearance between the inner peripheral retaining foot and the stamper surface is between approximately 5 $\mu$m and approximately 20 $\mu$m.

5. The mold for molding discs as defined in claim 3, wherein a close contact between the outer peripheral retaining foot and the surface of the stamper comprises a distance less than approximately 5 $\mu$m, whereby thermal expansion variation is taken into consideration.

* * * * *